Dec. 21, 1954 D. K. WEAVER, JR 2,697,816
SINGLE SIDEBAND GENERATOR MODULATING NEGATIVE FEEDBACK
Filed Feb. 3, 1954
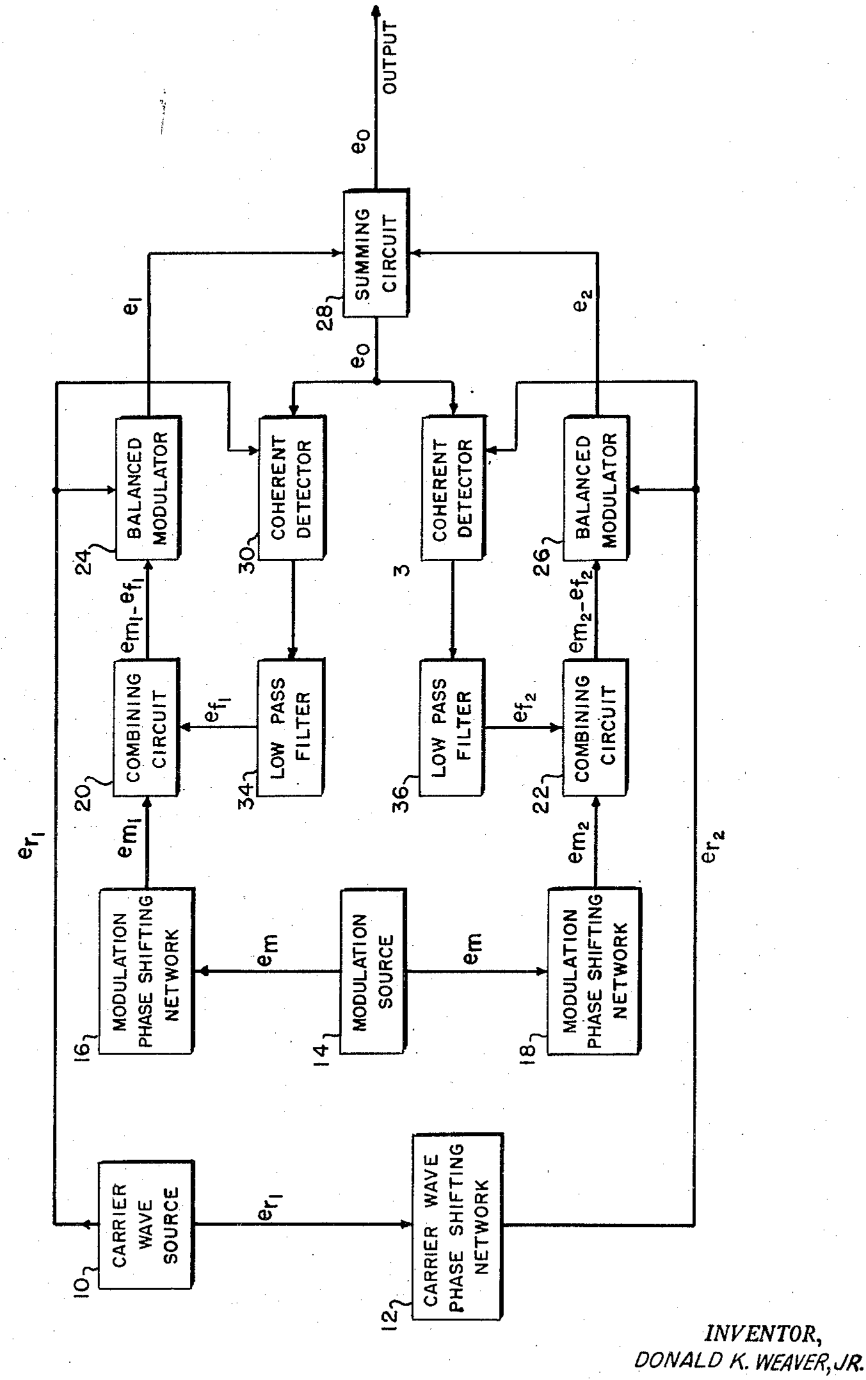
INVENTOR,
DONALD K. WEAVER, JR.
BY
Harry M. Saragovitz
ATTORNEY.

United States Patent Office 2,697,816

Patented Dec. 21, 1954

2,697,816

SINGLE SIDEBAND GENERATOR MODULATING NEGATIVE FEEDBACK

Donald K. Weaver, Jr., Palo Alto, Calif., assignor to the United States of America as represented by the Secretary of the Army Application February 3, 1954, Serial No. 408,052

1 Claim. (Cl. 332—45)

This invention relates to a single sideband generating system, and more particularly to a single sideband generating system employing negative feedback.

One scheme, well known in the art, for producing a single sideband utilizes two carrier waves having the same frequency and amplitude, but which are in phase quadrature, and two modulation signals having the same frequency spectrum, the frequency components of which have the same amplitude, but are in phase quadrature. One of the carrier waves and one of the modulation signals are applied to one balanced modulator and the other carrier wave and the other modulation signal are applied to another balanced modulator. By summing the outputs of the two balanced modulators one sideband of the carrier wave frequency and the modulation frequency spectrum is completely suppressed so that only a single sideband is obtained.

In practice, however, perfect equality in the amplitudes of the carrier waves and frequency components of the modulation signals is never achieved. Furthermore, exact phase quadrature between the two carrier waves and frequency components of the two modulation signals is never obtained. Because of these amplitude and phase errors an unwanted residual second sideband is produced by practical single sideband generators of the type described above.

It is an object of this invention to reduce the amplitude of the residual second sideband for given errors in the phase quadrature relationship and the amplitudes of the two carrier waves.

It is a further object of this invention to permit larger errors in the amplitude and phase quadrature relationship of the two carrier waves to be tolerated for a given amplitude of the residual second sideband. The features of this invention which are believed to be novel are set forth with particularity in the appended claim. The invention itself, however, both as to its organization and method of operation, together with further advantages thereof, may best be understood by reference to the following description taken in conjunction with the following drawing, wherein the single figure is a block diagram of the preferred embodiment of the invention.

Referring to the drawing, carrier wave $e_{r1}$ from source 10 is applied both to balanced modulator 24 and carrier-wave phase-shifting network 12. Network 12 shifts the phase of carrier wave $e_{r1}$ by approximately 90° with little effect on its amplitude. The carrier wave output $e_{r2}$ of network 12 is applied to balanced modulator 26. Carrier wave $e_{r1}$ is also applied to coherent detector 30 and carrier wave $e_{r2}$ is also applied to coherent detector 32. A modulation signal $e_m$ is provided by modulation source 14. Modulation signal $e_m$ is applied to both modulation phase shifting network 16 and modulation phase shifting network 18. The outputs of networks 16 and 18, $e_{m1}$ and $e_{m2}$, which are approximately equal in amplitude and approximately in phase quadrature, are respectively applied to combining circuits 20 and 22. The outputs of combining circuits 20 and 22 are respectively applied to balanced modulators 24 and 26. The outputs $e_1$ and $e_2$ of balanced modulators 24 and 26 are applied to summing circuit 28, which provides the single sideband output $e_0$. Negative feedback is achieved by applying the single sideband output $e_0$ both to coherent detectors 30 and 32. The output of coherent detector 30 is applied as a negative feedback signal $e_{f1}$ to combining circuit 20 through low-pass filter 34 and the output of coherent detector is applied as a negative feedback signal $e_{f2}$ to combining circuit 32 through low-pass filter 36. Each of combining circuits 20 and 22 provides an output which is proportional to the difference between the modulation signal input and a given proportion F of the negative feedback signal input applied thereto. As will be demonstrated below, this given proportion of negative feedback signal F is that which makes the amplitude of the single sideband output one-half as much as it would be if no negative feedback were employed.

The equations for the carrier waves $e_{r1}$ and $e_{r2}$ and modulation signals $e_{m1}$ and $e_{m2}$ are as follows:

$$e_{r1}=\sin \omega_r t \qquad (1)$$

$$e_{r2}=E_r \cos (\omega_r t+\varphi_r) \qquad (2)$$

$$e_{m1}=\cos \omega_m t \qquad (3)$$

$$e_{m2}=E_a \sin (\omega_m t+\varphi_m) \qquad (4)$$

where the carrier frequency is $\omega_r$ and the modulation frequency is $\omega_m$ radians per second, the RF amplitude unbalance, that is, the ratio of the amplitude of $e_{r2}$ relative to that of $e_{r1}$ is $E_r$, and the phase error in the phase quadrature relationship between the two carrier waves is $\varphi_r$, and similarly, the audio modulated unbalance is $E_a$ and the phase error in the modulation signal is $\varphi_m$.

With the four inputs given in Equations 1 to 4, it can be shown by mathematical analysis that where the phase errors are less than 10° and the amplitude unbalance is small, the output from the summing circuit with and without negative feedback will be to a very close approximation as follows:

$$B_0=1 \qquad (5)$$

$$B=\frac{1}{1+F} \qquad (6)$$

$$A_0=\frac{1-E_aE_r}{2}-j(\varphi_r-\varphi_m) \qquad (7)$$

$$A=\frac{1}{2(1+F)}\left[\frac{1}{1+F}+\left(\frac{F}{1+F}-E_a\right)E_r+j\left(\varphi_m+\frac{F-1}{F+1}\varphi_r\right)\right] \qquad (8)$$

where $B_0$ is the relative amplitude of the desired single sideband without negative feedback, B is the relative amplitude of the wanted single sideband with negative feedback, $A_0$ is the relative amplitude of the unwanted second sideband without negative feedback, and A is the relative amplitude of the unwanted second sideband with negative feedback, F is the given proportion of negative feedback applied to the balance modulator, and $j$ is the square root of minus one.

For the special case where $F=1$ and $E_a=1$ Equations 6 and 8 respectively reduce to:

$$B=\frac{1}{2} \qquad (9)$$

$$A=\frac{1}{4}\left(\frac{1-E_r}{2}+j\varphi_m\right) \qquad (10)$$

by comparing Equations 10 and 8 it will be seen that for the special case where $F=1$, the term containing $\varphi_r$ is completely cancelled, and by comparing the real terms of Equations 10 and 9, and 7 and 5, it will be seen that the ratio of the amplitude of the unwanted second sideband to the desired single sideband with negative feedback, where $E_a=1$ and $F=1$, is one-half the ratio of the amplitude of the unwanted second sideband to the wanted single sideband without negative feedback.

While there has been described what is at present considered to be a preferred embodiment of the invention, it will be obvious to those skilled in the art that various changes and modification may be made therein without departing from the invention, and it is, therefore, aimed in the appended claim to cover all such changes and modifications as fall within the true spirit and scope of the invention.

What is claimed is:

A single sideband modulation system comprising first and second combining circuits, each of which provides an output proportional to the difference between a first input signal and a given proportion of a second input signal applied thereto, means producing first and second modulation signals having the same frequency spectrum and wherein corresponding frequency components of said first and second modulation signals have approximately equal amplitudes and are approximately in phase quadrature, means for applying said first modulation signal as said first input signal to said first combining circuit, means for applying said second modulation signal as said first input signal to said second combining circuit, first and second balanced modulators, means producing first and second carrier waves having the same frequency and approximately equal amplitudes and which are approximately in phase quadrature, means for applying said first and second carrier waves respectively as first inputs to said first and second balanced modulators, means for applying the outputs of said first and second combining circuits respectively as second inputs to said first and second balanced modulators, a summing circuit for summing the output of said first balanced modulator and the output of said second balanced modulator, whereby the output of said summing circuit is a single sideband of the carrier wave frequency and the frequency spectrum of said modulation signals, first and second coherent detectors, means for applying the output of said summing circuit and said first carrier wave as first and second inputs respectively to said first coherent detector, means for applying the output of said summing circuit and said second carrier wave as first and second inputs respectively to said second coherent detector, a first low-pass filter having the output of said first coherent detector applied thereto for providing a first negative feedback signal, a second low-pass filter having the output of said second coherent detector applied thereto for providing a second negative feedback signal, and means for applying said first and second negative feedback signals respectively as said second input signals to said first and second combining circuits, the given proportion of the second input signal appearing in the output of each combining circuit being that which makes the amplitude of the single sideband one-half as much as it would be if no negative feedbacks were employed.

References Cited in the file of this patent

UNITED STATES PATENTS

| Number | Name | Date |
|---|---|---|
| 2,248,250 | Peterson | July 8, 1941 |
| 2,557,194 | Mitsom | June 19, 1951 |